United States Patent Office 2,914,413
Patented Nov. 24, 1959

2,914,413

CEMENT COMPOSITION AND METHOD OF PREPARATION

Robert S. Mercer, Oreland, Pa., assignor to Pennsalt Chemicals Corporation, Philadelphia, Pa., a corporation of Pennsylvania No Drawing. Application January 30, 1958
Serial No. 712,078

15 Claims. (Cl. 106—84)

The present invention relates to cold setting cement compositions, that is cements which "set up," or harden, at ambient temperatures and do not require high temperature firing to produce the desired hardening or cure. The invention is particularly concerned with, although not limited to, cements having high corrosion resistance, particularly resistance to acid corrosion.

Among the various cements that are most commonly employed in applications where high corrosion resistance is required are those in which concentrated solutions of sodium silicate of the type known as "water glasses" are employed as the bonding agent. Such cements comprise an inert filler, such as silica, concentrated sodium silicate solution as the binder, and are caused to harden or "set up" by the use of an acidifying agent which may be either an acid in itself or which may decompose slowly to liberate acid to neutralize the alkalinity of the sodium silicate. Acid setting agents for this class of cements may be exemplified by sodium fluosilicate, carbon dioxide from the air, and ethyl acetate. The following equations illustrate the setting action of these acid materials on the sodium silicates in the cement. For the purpose of illustrating the reactions, sodium metasilicate has been shown as the sodium silicate rather than a water glass since the latter have indeterminate formulas:

I.  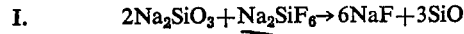

II. 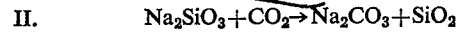

III. 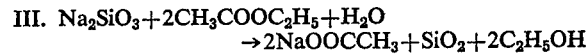

In each of the above cases, acidification of the sodium silicate precipitates silica, the precipitated silica forming a network which is responsible for the strength and coherence of the cured cement.

It will be observed in the above reactions that all the sodium present in the original sodium silicate is retained in the cured cement. Some of it may later be leached out under the conditions of use of the cement, but in actual practice it is known that much of the sodium present is retained. When such cements are exposed to sulfuric acid for example, which is frequent in the uses to which they are put, some of the sodium salt is converted to sodium sulfate. If sodium sulfate is first formed in the cement as the anhydrous salt and if later conditions allow it to absorb water and become a hydrated salt, the crystals change their shape and increase in volume so that the article embodying the cement cracks or spalls. Anhydrous sodium sulfate itself may undergo crystalline alteration with the same result. Difficulties are also encountered in the case of potassium silicate cements probably arising from the formation of complex salts such as alums by combination of potassium sulfate formed during the setting of the cement with iron or aluminum which may be present as impurities for example. In cements of this type, the presence of large amounts of sodium or potassium salts in the silica network is an inherent characteristic since the sodium or potassium silicate provides the source of the silica.

In the case of the sodium fluosilicate setting agents (Equation I) which at present are among those most widely used for the silicate cements, the relatively high residual sodium fluoride content causes formation of hydrofluoric acid when exposed to strong acid at elevated temperatures. This acid, as is well known, can attack silica and thus weaken the cement structure.

It is the object of this invention to provide a novel, cold setting cement which is largely free from the disadvantages discussed above which are inherent in the commonly used silicate cements. Specifically, it is the object of this invention to provide cements which, although based on the use of a precipitated silica as the binding agent, contain a greatly reduced content of sodium, potassium, or other cations, tending, in a curved cement to reduce chemical resistance, and at the same time are usually harder, stronger and more dense than silicate cements.

The cements of the present invention comprise, in a common with the silicate cements discussed above, three essential components, namely, an inert filler, a binder, and a setting agent for the binder. In sharp contradistinction, however, to the silicate cements, the binders used in the cements of the invention are alkali precipitable rather than acid precipitable as in the case of the sodium and potassium silicate cements, and furthermore the setting agent employed in the cements of the invention are alkaline materials rather than acidic.

In accordance with the invention, the binder component of the cement comprises an aqueous silica sol which for the vast majority of applications should have a colloidal silica concentration of at least 10% by weight and preferably at least 20% by weight. There is apparently no upper limit for the silica content, provided the sol is liquid but generally sols of 45% silica by weight or more are difficult to prepare and not generally available.

Many methods for preparing aqueous silica sols are known. One of the earliest processes of commercial importance is described in U.S. Patent 2,244,325 to Bird according to which a dilute sodium silicate solution is passed through a bed of an acidic ion exchange resin, such as an acid treated carbonaceous zeolite, to reduce the alkali metal ion content of the original silicate solution to low values, such that the final $SiO_2:Na_2O$ ratio is at least 10:1 and preferably higher such as 50:1 or 100:1. This yields a dilute aqueous silica sol which may then be concentrated by evaporation.

Another suitable method for the preparation of a silica aquasol is described in U.S. Patent 2,375,738 to White according to which a sodium silicate solution is neutralized with acid to precipitate silica gel, after which the gel is synerized, crushed, washed to remove soluble salts, covered with a dilute alkali (e.g. 0.1% NaOH) solution and then heated in an autoclave at temperatures between 80° C. and 200° C. for several hours.

More recently, improved silica sols have appeared such as those described in U.S. Patents 2,574,902 and 2,577,485. According to the process described in these patents an aqueous silica sol, such as that produced by the process of the Bird Patent 2,244,325 referred to above, having colloidal silica particles of less than 10 millimicrons in size, is treated to increase the average size of the silica particles. The sols produced by these processes are stable at concentrations of 20% to 35% by weight of colloidal silica, contain silica particles which are usually remarkably uniform in size, and are preferred in the practice of the invention.

Other suitable processes for producing aqueous silica sols are described in U.S. Patents 2,680,721, 2,601,235, 2,668,149 and 2,650,200. It is to be understood of course that the invention is not limited to any particular method for preparing the silica sol, although as pointed out above, the sols produced by certain methods are preferred.

As is well known, silica sols, as distinguished from alkali metal silicate solutions, contain a low alkali concentration. As mentioned in the Bird Patent 2,244,325, in the case of silica sols containing sodium ions, a $SiO_2:Na_2O$ ratio of about 10:1 is the practical upper limit of sodium concentration. As stated by Bird, higher $SiO_2:Na_2O$ ratios such as 50:1 or 100:1 are preferred. According to U.S. Patent 2,574,902 referred to above, the desirable range of $SiO_2:Na_2O$ ratios is given as 60:1 to 130:1, while in U.S. Patent 2,577,485 sols having $SiO_2:Na_2O$ ratios ranging up to 500:1 are described. In the preferred sols of the invention, considering cost as well as desirability, the alkali content of the sol expressed as the $SiO_2:Na_2O$ weight ratio ranges from about 50:1 to 300:1. While lower ratios can be used (e.g. down to $10SiO_2:1Na_2O$ in the case of sols containing sodium ions) such sols are not as desirable because they introduce appreciable amounts of alkali, such as sodium ions, into the cured cement which is undesirable for the reasons pointed out above. Higher ratios can also be employed, e.g. a $SiO_2:Na_2O$ ratio of 500:1, but such extremely low alkali content sols are usually rather expensive. Some minimum content of alkali, in the form of sodium, potassium, lithium, or ammonium ions is desirable and indeed considered essential for imparting good stability to the sol. The stabilizing effect of a small amount of sodium ions is discussed in U.S. Patents 2,244,325 and 2,574,902 referred to above. The alkaline reacting sols described by these patents are thus preferred for their stability. In the case of sols stabilized by sodium ions maximum stability is usually obtained between a pH of about 8 to 10 although fairly stable sols are obtainable at lower and higher pH values. Acid reacting silica aquasols are generally considerably less stable and thus not as desirable or as convenient to use.

A characteristic which distinguishes silica sols from materials which have sometimes been loosely referred to as silica sols, such as sodium silicate solutions, is the fact that the silica content of a silica sol of appreciable silica concentration may normally be precipitated as a silica gel by adding alkali such as NaOH, to the sol. An aqueous sodium silicate solution on the other hand is merely made more alkaline by adding NaOH: a silica gel does not precipitate. Similarly, a sodium silicate solution which has been partially neutralized by acid, but not otherwise treated, may contain some material which might be classified as colloidal silica, but such a partially neutralized solution will not normally precipitate silica gel when NaOH is added but will merely become more alkaline, the precipitated silica going back into solution as sodium silicate.

Silica sols are commercially available from a number of suppliers such as from the E. I. du Pont de Nemours & Company under the trademark Ludox, these being alkaline reacting sols containing from 20% to 35% by weight of colloidal silica and being prepared by the methods described in U.S. Patents 2,574,902 and 2,577,485. Other suppliers include the Monsanto Chemical Company which produces a sol under the trademark Syton, containing about 30% $SiO_2$ and less than 1% $Na_2O$, and the National Aluminate Corporation which produces a sol under the trademark Nalcoag containing about 35% $SiO_2$ and less than 1% $Na_2O$. These sols may be used at full strength or diluted to not less than about 10% $SiO_2$ as desired.

In accordance with the invention, it has been found that cements employing aqueous silica sols as the binder may be converted into strong, highly corrosion and heat resistant, cured products by the use of a certain specific class of setting agents comprising solid alkali metal silicates having alkali metal oxide to silica mole ratios within the range of 1:1 to 1:4.2. In the specification and claims which follow the alkali metal oxide to silica ratios given are in all cases mole ratios. The silicates in this range can be prepared in glassy form although quenching may be necessary in the case of the higher ratios. In the case of the sodium silicates, sodium metasilicate and sodium disilicate are the only crystalline compounds known in this particular range, as shown in "Phase Diagrams for Ceramists," Levin, McMurdie and Hall, edited and published by The American Ceramic Society, Inc., 1956. In practicing the invention it is preferred that the silicate setting agent be not only solid but also substantially anhydrous, since with these the strongest cements are obtained. However, solid hydrated silicates can also be used to make good cements. Thus, glassy silicates in the above range of mole ratios containing as much as 20% water and crystalline hydrated silicates containing as much as 42% water give good cements.

The use of the above class of alkali metal silicates in solid form is essential in the practice of the invention. Almost any alkaline material and many other materials such as strong acids and soluble salts such as sodium sulfate or ammonium chloride will precipitate the sols employed, but the solids formed by adding such precipitating agents are very weak and can be crumbled in the hand. Similarly, the use of alkali metal silicates having higher alkali metal oxide:silica ratios than those defined above will likewise precipitate the sol, but the solids produced are extremely weak and have no utility, while alkali metal silicates having lower alkali metal oxide:silica mole ratios than those defined above will often not set the cement at all and in any case will produce only weak structures. Liquid solutions of alkali metal silicates such as liquid water glasses, as contrasted to the solid alkali metal silicates, even if the liquid silicates are within the above defined range of mole ratios, will cause precipitation of the sol but will produce only very weak cements.

Although the mechanism of the action of the solid alkali metal silicate setting agents of the invention, through which the remarkable strength and greatly improved corrosion resistance is imparted to the cements, has not yet been fully elucidated, it appears that they cause a type of ordered precipitation of gel from the silica sol which greatly improves the bonding action of the silica. Whatever the mechanism, we have found that the combination of the defined type of silica sol with the defined setting agent is required to produce the advantageous results obtained in the present invention. This is illustrated for example by the following table wherein typical cements, both prepared with an aqueous silica sol, one with, and one without, the solid alkali metal silicate setting agent are compared (all other factors being the same):

TABLE I

| Mechanical Strength (lb./sq. in.) | "Silica Sol" containing a solid silicate setting agent [1] | "Silica Sol" containing no setting agent [2] |
| --- | --- | --- |
| tensile | 373 | 50 |
| compressive | 3,560 | 1,100 |

[1] For the composition of this cement, See Example I.
[2] The composition of Example I with the setting agent omitted.

The improvements obtained by using an aqueous silica sol in combination with the required alkali metal silicate setting agent over the commonly used water glass cements is well illustrated by the following comparison, which indicates in general the order of magnitude of the improvement in corrosion resistance and mechanical strength:

TABLE II

| Average Performance in Standard Physical Tests | Type of Cement | |
|---|---|---|
| | "Silica Sol" [1] | Sodium silicate solution ("Waterglass") [2] |
| Corrosion Resistance (weight loss after immersion for 28 days): | | |
| 96% boiling $H_2SO_4$ | 2% (increase) | 4–19% (loss). |
| 96% $H_2SO_4$ at 70° F | 1.6% (loss) | 4–9% (loss). |
| 30% $H_2SO_4$ at 70° F | 0.1% (loss) | 5–6% (loss). |
| 1% $H_2SO_4$ at 70° F | 1% (loss) | 5–6% (loss). |
| boiling water | 4.5 (loss) | 10–15% (loss). |
| water at 70° F | 1.5% (loss) | 5–9% (loss). |
| Mechanical Strength (lb./sq. in.): | | |
| tensile strength | 373 | 100–300. |
| compressive strength | 3,560 | 1,000–1,800. |

[1] For the composition of this cement, see Example I below.
[2] Range of values obtained in testing four commercial sodium silicate solution (waterglass) cements.

Though any of the alkali metal silicates (of the proper metal oxide:$SiO_2$ ratio) may be used as setting agents, such as sodium, potassium, and lithium silicates, it has been found that the strongest cements are obtained where the silicate is a sodium silicate, having the above defined range of $Na_2O:SiO_2$ mole ratios. For the sodium silicate setting agents, cements with the greatest strength are obtained when the $Na_2O:SiO_2$ mole ratio is within the range of 1:1.4 to 1:2.3. Longer working life of the cement (that is the period between mixing the wet and dry ingredients and the time the wet cement becomes too stiff to work) is obtained at somewhat higher $Na_2O:SiO_2$ ratios than 1:2.3. Thus from the standpoint of both strength and working life, solid sodium silicates having $Na_2O:SiO_2$ mole ratios between 1:1.4 and 1:3.3 will generally give the best overall results.

The effect of the $Na_2O:SiO_2$ ratio of the setting agent on the strength of the cement is shown by Table III, where tensile strength is compared. In preparing samples for this comparison an alkali precipitable sol was employed manufactured by Du Pont under the trade name "Ludox" and having the following analysis:

| | |
|---|---|
| $SiO_2$ (weight percent) | 30.4 |
| $Na_2O$ (weight percent) | 0.14 |
| pH | 8.45 |
| Viscosity (centipoises at 22° C.) | 16.1 |
| Density (grams per cubic centimeter) | 1.206 |

The filler consisted of 76 parts of quartz flour, 16 parts quartz sand and 5 parts by weight of clay. The filler was blended with 3 parts by weight of the setting agent designated. The ratio of filler-plus-setting-agent to "Ludox" remained constant at 3.4 parts to 1 part by weight.

TABLE III

| Setting Agent | Tensile Strength (lb/sq. in.) | |
|---|---|---|
| | 7 days' cure | 14 days' cure |
| $Na_2O$:1.33 $SiO_2$ | 247 | |
| $Na_2O$:1.52 $SiO_2$ | 400 | 711 |
| $Na_2O$:1.62 $SiO_2$ | 438 | 520 |
| $Na_2O$:1.70 $SiO_2$ | 447 | 663 |
| $Na_2O$:1.85 $SiO_2$ | 564 | |
| $Na_2O$:2.0 $SiO_2$ | 456 | 530 |
| $Na_2O$:3.32 $SiO_2$ | 286 | 366 |
| $Na_2O$:4.22 $SiO_2$ | 232 | 265 |

With respect to the inert filler, which comprises the major proportion of the compositions of the invention, this in general may be any filler which is essentially insoluble in the water of the silica sol and which is substantially inert with respect to the sol. A great variety of substances fall within this classification such as silica, various insoluble silicates including many minerals, such metallic oxides as the iron oxides, titania, zirconia and calcined alumina, such insoluble salts as barium sulfate and calcium carbonate, silicon carbide and iron carbide, and such metals as iron and copper. Sulfur can be used, and carbon which is free from oil such as powdered graphite. Organic fillers like ground walnut shell and wood flour may be employed. Even certain organic compounds like powdered naphthalene, which is water insoluble but solvent soluble, may be employed to obtain special effects; for example, naphthalene may be leached from the cement after hardening to provide a structure of controlled porosity.

As will be apparent to those skilled in the art, some materials are obviously unsuitable as fillers, such, for example, as soluble materials such as sugar which would dissolve in the silica sol. Finely-divided aluminum powder, likewise, would not be suitable since the slight alkalinity of the sol would attack the metal surface and cause formation of hydrogen. Soluble salts are unsuitable since they would both dissolve in the sol and interfere with the proper action of the setting agent. Oily carbon black, generally known as "gas black," while usable, could not be used with any expectation of obtaining a strong cement structure since the filler particles would be coated with an oil film which would interfere with the formation of a solid structure.

The wide variety of fillers which can be employed suggest many of the uses to which the cements of the invention can be put. Depending on the filler employed, for example, cements of the invention may be used for the making of tiles, bricks, high temperature resistant tubes and molded shapes, paint-like thin coatings, electrical resistors (with organic or ceramic overglazes applied subsequent to forming) filters, partly metallic bearings, partly metallic structures of high electric resistance but good thermo-conductivity, magnets, etc., and cements suitable for use as mortars in chemical resistant construction.

Some of the materials which can be used as fillers are shown in Table IV where tensile strength of the cements is compared. Samples were prepared by screening the aggregates so that in all cases 80% passed a 325 mesh screen, and blending them with 5.4% clay and 5% vitreous sodium disilicate setting agent. Each filler thus prepared was then mixed with sufficient "Ludox" sol to give a workable mortar, the proportions (by weight) of filler to sol in each case being recorded in the table.

TABLE IV

| Aggregate | Parts Filler per part "Ludox" | Tensile Strength (lb/sq. in.) | |
|---|---|---|---|
| | | 7 days' cure | 14 days' cure |
| Quartz ($SiO_2$) | 3.4 | 539 | 1,266 |
| Beryl ($3BeO \cdot Al_2O_3 \cdot 6SiO_2$) | 3.58 | 776 | 1,820 |
| Mullite ($3Al_2O_3 \cdot 2SiO_2$) | 3.45 | 874 | 1,593 |
| Feldspar ($K_2O \cdot Al_2O_3 \cdot 6SiO_2$) | 2.84 | 811 | 753 |
| Olivine (($Mg, Fe)_2SiO_4$) | 2.56 | 520 | 700 |
| Zircon ($ZrSiO_4$) | 6.0 | 348 | 546 |
| Wollastonite ($CaSiO_3$) | 2.37 | 635 | 515 |
| Asbestos ($H_4Mg_3Si_2O_9$) | 0.57 | 465 | 477 |
| Nepheline syenite (($Na,K)_2 \cdot Al_2O_3 \cdot 2SiO_2$) | 3.07 | 533 | 432 |
| Amblygonite ($AlPO_4 \cdot LiF$) | 3.8 | 863 | 1,210 |
| Fluorspar ($CaF_2$) | 4.39 | 666 | 751 |
| Alumina ($Al_2O_3$) | 2.8 | 705 | 957 |
| Silicon carbide (SiC) | 1.74 | 512 | 606 |
| "Red mud" (insoluble residue from caustic digestion of bauxite) | 1.97 | 286 | 327 |

As with other cements, the strength of the cured cement is dependent to some degree on the particle size and particle size distribution of the filler. Even where it is desired to include in the cement mass a considerable portion of large aggregate for reasons of economy or special purposes (e.g. grinding wheels), some finely-divided filler should generally be included in order to achieve maximum strength. In those occasional instances where it is desirable to create a cement mass of low strength, for example in making molds or cores for casting, fine filler may be omitted.

In the cured cement compositions of the invention, the filler constitutes the major constituent by weight of the cured cement. In the vast majority of applications, the ratio in the final cured cement of solids contributed by filler and those contributed by the combination of the silica binding agent and the setting agent therefor will range from 97:3 to 80:20 and in most applications, this ratio would be in a narrower range from about 95:5 to 85:15. In the great majority of cases, a high filler to silica sol binding agent ratio is desirable from the standpoint of minimizing porosity in the cured cement and shrinkage during curing. The silica sols commonly available, as previously pointed out, contain of the order of 30% of $SiO_2$ and the water content of the mortar must of course be lost by evaporation during curing.

It is frequently desirable to employ mixed fillers. The mixture may be in terms of particle size, that is, a single composition such as quartz might be used in three particle sizes, including gravel, fine sand and quartz flour. Materials may be included in a mixture for the sake of their shape or porosity or density. Fibrous minerals such as asbestos may be included or laminar minerals such as mica. Minute hollow bubbles which have recently become commercially available may be included. Such "microballoons" composed of phenolic resin or of aluminum oxide can both be used in the cements of this invention to provide lighter structures which are good thermal insulators. Fibre glass and rock wool have been used to make cementitious masses of particular properties. It is quite often desirable to add minor percentages of clay to a cement composition for the sake of the plastic properties it gives to the initial mortar. Materials such as kaolin, allophane, montmorillonite, vermiculite, attapulgite, bentonite, etc., will often improve the workability of a mortar, and may be used if their presence in the final cement mass will not interfere with the use intended.

A filler material that possesses many advantages, and is preferred for many uses, is quartz. When quartz is used in the cements of the present invention, it will be apparent that the resulting cementitious mass will be composed almost entirely of pure silica. Cements can thus be obtained containing less than 1% alkali metal oxide, the remainder being silica, whereas with conventional sodium silicate cements the alkali metal oxide content is many fold greater. Such cements, having in combination a very high silica and a very low alkali content, have heretofore been unobtainable.

Furthermore, in contrast to the silicate cements in most common use today which employ sodium fluosilicate as the setting agent for a sodium silicate solution, the cements of the invention contain no sodium fluoride. This eliminates the problem common to these prior cements of sodium fluoride being converted under acid conditions to hydrofluoric acid which then attacks the cement structure.

Surprisingly, these highly siliceous cements are much more resistant to corrosion by alkalies than the silicate cements. The reason for this increased alkali resistance is not known for certain, but it may be that at least some areas of the silica network are too closely bonded to permit ingress of alkali metal ions.

One of the particular advantages of the quartz-filled silica sol cements is that they are substantially better for use at elevated temperatures than the sodium silicate cements. The alkali metal oxide content of the cements of the present invention can be as little as one tenth of a percent by weight, if desired, and need not exceed 2% in any cement composition. It is advantageous in certain refractory applications to employ a cement approaching pure quartz in composition.

Cement compositions of this invention, while they may be cured entirely at room temperature, will sometimes be found to have substantially increased mechanical strength after being subjected to elevated temperatures. Thus a representative cement, before heat treatment, had a tensile strength of 392 lbs./sq. in., but after treatment at 1050° C. for 24 hours the tensile strength increased to 493 lbs./sq. in.

In practicing the present invention the silica sol may be mixed directly with the filler material and the setting agent then added, or the setting agent may be blended with the filler and the resulting powder then blended with the silica sol to prepare the cement mortar. The latter method is preferred for most industrial applications.

The solid alkali metal setting agents should of course be in finely divided form so that the setting agent will be distributed uniformly throughout the cement and thus produce uniform setting action on the silica sol. The setting agent is generally blended with the filler in amounts of approximately 0.2% to 15% by weight of the filler, and in many applications preferably 2 to 10% by weight.

In the preferred method of preparing the cements of the present invention, the filler containing the setting agent is blended into a mortar with the liquid silica sol. The proportions of the dry ingredients to the liquid sol may vary widely within wide limits depending on the nature of the filler, its particle size and its density and on the consistency of the mortar desired. The wide range of possible solids to liquid ratios has already been indicated in Table IV ranging from 0.5 for asbestos to 6 for zircon. When using primarily silica flour as the filler, the solids to liquid ratio is preferably within the range of about 3.1 to 3.7 by weight.

A modification which has proved to be helpful in preparing silica sol cements is the use of a plurality of solid silicate setting agents of varying $Na_2O:SiO_2$ ratio. By this expedient the working life and setting time can readily be controlled, often to great advantage. In general, the setting agents with relatively higher alkali content (within the operable range of alkali metal oxide:silica mole ratios of 1:1 to 1:4.2) appear to set the cements faster than those with a relatively higher silica content. An example of the effect obtained by using a combination of silicates is given in Table V where, for comparison, the cements were all made with quartz flour and the "Ludox" sol previously described in the weight ratio of 3.4 to 1. The setting agents as designated were present in a total amount of 3% by weight of the filler.

TABLE V

| Setting Agent: | | | | | | |
|---|---|---|---|---|---|---|
| $Na_2O:2SiO_2$ (percent) | 3 | 2 | 1.5 | 1 | 0.5 | 0 |
| $Na_2O:3.3SiO_2$ (percent) | 0 | 1 | 1.5 | 2 | 2.5 | 3.0 |
| Working Life (minutes) | 17 | 27 | 43 | 80 | 72 | 134 |
| Setting Time (hours) | 2.5 | 2.9 | 3.2 | 3.2 | 4.2 | 7 |

For convenience in handling, it is obviously desirable to use a mortar which has the longest possible working life (i.e., the period during which it may be poured into containers, troweled, extruded or the like) consistent with the shortest possible setting time (i.e. the elapsed period until unsupported shapes can be safely handled without special precautions). From this table it is apparent that in the case of the two silicates employed the most desirable working life and setting time are obtained when the ratio of the silicate: $Na_2O:3.3SiO_2$ to the silicate: $Na_2O:2SiO_2$ is within the range of 1:1 to 5:1 and that the best ratio is 2 to 1. In this case the more alkaline silicate ($Na_2O:2SiO_2$) appears to be the faster setting agent of the two; it is also more rapidly soluble than the more siliceous silicate.

Generally speaking, better results will usually be obtainable by blending two silicates within the above defined operable range, one of which is relatively high in alkali metal content and the other of which is relatively low in alkali metal content, than are obtainable by using a single silicate having a composition which is the average composition of the two.

Particle size of the solid silicate setting agent may also be varied and it appears that this also effects the speed of set, though to a secondary extent, with the finely powdered silicates giving more rapid set than the coarser particles.

The following examples will help to further illustrate the practice of the present invention. These examples, however, are given for the purpose of illustration only and are not to be considered as limiting the invention:

Example I

The following materials were used to make an all-purpose cement, specimens of which were subjected to the comparative tests shown in Tables I and II above.

Parts by weight

Powder (consisting of filler and setting agent):
  Filler (consisting of sand, flour and clay)__ 329.8
    1. "Berkeley Sand #1" (Pennsylvania Pulverizing Co.)_____ 55.0
      (A quartz sand having the following screen analysis (Tyler screens)):

| Screen | Percent Retained | Percent Cumulative |
|---|---|---|
| 20 | 0.0 | 0.0 |
| 42 | 46.6 | 46.6 |
| 60 | 40.4 | 87.0 |
| 80 | 10.7 | 97.7 |
| 100 | 1.3 | 99.0 |

2. "120 Mesh Supersil" (Pennsylvania Pulverizing Co.)_____ 256.6
      (A quartz flour having the following analysis):

| Screen | Percent Retained | Percent Cumulative |
|---|---|---|
| 115 | 0.65 | 0.65 |
| 150 | 1.51 | 2.16 |
| 170 | 0.96 | 3.12 |
| 200 | 6.92 | 10.04 |
| 250 | 3.29 | 13.33 |
| 325 | 10.00 | 23.33 |

3. "Homer Clay" (United Clay Mines), essentially kaolinite_____ 18.2
  Setting Agent (consisting of two sodium silicates) _____ 10.2
    1. "SS-65-Pwd." (Philadelphia Quartz Company) _____ 6.8
      (A powdered solid silicate having the composition (weight percent and mole ratio)):

| $Na_2O$ | $SiO_2$ | $H_2O$ | $Na_2O/SiO_2$ |
|---|---|---|---|
| 23.1 | 74.1 | 1.5 | 1/3.32 |

2. "SS-C-Pwd." (Philadelphia Quartz Company) _____ 3.4
      (A powdered solid silicate having the composition):

| $Na_2O$ | $SiO_2$ | $H_2O$ | $Na_2O/SiO_2$ |
|---|---|---|---|
| 32.7 | 65.4 | 0 | 1/2.06 |

Total Powder_____ 340.0
  Liquid: "Ludox" (Du Pont)_____ 100
    (A colloidal silica sol having the following analysis):
      $SiO_2$ (wt. percent)_____ 30.4
      $Na_2O$ (wt. percent)_____ 0.14
      pH _____ 8.45
      viscosity (cp. at 22° C.)_____ 16.1
      density (g./cc.)_____ 1.206

To prepare the cement specimens, the filler and setting agent were thoroughly blended to form the powder and then made into a mortar with the liquid sol. The mortar, having good workability, was cast into shapes suitable for testing. Its working life was about 1 hour, and the cement was firmly set in about 3 hours. The molded specimens, after aging for 14 days at about 70° F. and constant humidity, were tested for corrosion resistance and mechanical strength. The results of these tests have been presented in Table I.

Example II

An anhydrous potassium silicate glass having a $K_2O/SiO_2$ ratio of 1/3.91 was used in place of the 2 sodium silicate setting agents of Example I in the same amount, all other conditions being the same as those given in Example I. The resulting cement had a tensile strength of 337 lb./sq. in. after 14 days' cure.

Example III

A devitrified anhydrous lithium silicate having a $Li_2O/SiO_2$ ratio of 1/2 was used as the setting agent in place of the sodium silicates of Example I in an amount of 10.0 parts by weight, all other conditions being the same. The resulting cement had a tensile strength of 291 lb./sq. in. after 14 days' cure.

Example IV

A series of "figure eight" specimens were prepared wherein the sols used were varied as indicated in the following table. In all cases the filler and setting agent were those of Example I, the powder-to-liquid weight ratio varying as indicated. The specimens were subjected to tensile strength tests after 7 days' curing, the results being given in the table.

TABLE VII

| Sol | Powder/ Liquid | Tensile Strength (lb./sq. in.) |
|---|---|---|
| "Syton C-30" (Monsanto), 30% $SiO_2$ sol containing less than 0.02% NaCl | 3.4/1 | 315 |
| "Nalcoag" (National Aluminate), 35% $SiO_2$ sol containing a trace of sodium | 3.4/1 | 311 |
| "Ludox" (as in Example I) diluted to 25% $SiO_2$ | 3.66/1 | 247 |
| "Ludox" diluted to 20% $SiO_2$ | 3.87/1 | 276 |
| "Ludox" diluted to 15% $SiO_2$ | 4.05/1 | 199 |
| "Ludox" diluted to 10% $SiO_2$ | 3.98/1 | 151 |

Example V

A filler consisting of 44.8% "Borolon" (an abrasive grain alumina) having a particle size of about 100 mesh, 44.8% silicon carbide of about 60 mesh and 5.4% kaolin was mixed with 5% by weight sodium silicate glass ($Na_2O:SiO_2$ of 1:2) and then made into a mortar with the "Ludox" sol of Example I in the proportions of 5.33 parts filler plus setting agent per part by weight of sol. The resulting cement had a tensile strength of 855 lb./sq. in. after 7 days' cure and 1313 lb./sq. in. after 14 days. The abrasive nature of the filler used in this and similar instances makes the resulting composition excellently suited in grinding, polishing and abrasive applications.

Example VI

The filler and sol of Example I were used to make cement specimens wherein the setting agent consisted of (1) 5% glassy sodium disilicate by weight of the filler, and (2) 10% of the same setting agent. Other conditions remained the same. The first composition had a tensile strength of 664 lb./sq. in. in 7 days, increasing to 1272 lb./sq. in. in 14 days. The second was 332 lb./sq. in. in 7 days, and 494 lb./sq. in. in 14 days.

The cementitious compositions described herein may be used not only as the cement mass in itself, but may also be used as the bonding material for bonding together larger aggregates. The size of the larger aggregate is immaterial, and may for example be gravel when a concrete is needed, or broken refractory bricks that need mending, etc. The following is an example of use of this type.

*Example VII*

The cement composition of Example I was used as the bonding material for a concrete having the composition:

| | Parts by weight |
|---|---|
| ½–¼ inch gravel | 100 |
| 10–28 mesh gravel | 50 |
| Berkeley sand #1 | 50 |
| Fine, dry sand | 20 |
| Composition of Example I | 84 |

This composition was trowelled into a slab which set in a few hours to a hard, rough concrete.

Curious and useful compositions can be made in accordance with the present invention when a metal powder is used as the filler. Metals such as copper, iron and silicon have been made into molded shapes which closely resemble solid pieces of the metal in appearance and density, and which can be polished to a high metallic lustre, but which have greatly reduced electrical conductivity. These molded metal compositions have mechanical strengths similar to those already indicated for the non-metallic filler compositions. The following is an example of a metal-filled silica sol composition of this type.

*Example VIII*

| | Parts by weight |
|---|---|
| "Reduced Iron Merck NF" (an electrolytically reduced iron powder sold by Merck & Company) | 479.4 |
| "Homer Clay" | 28.9 |
| Anhydrous sodium disilicate powder | 26.7 |
| Total powder | 535.0 |
| "Ludox" silica sol | 100 |

The above powder and sol were made into a mortar and cast into "figure eight" molds. After 14 days' cure, the specimens gave an average tensile strength of 1300 lb./sq. in.

It is sometimes desirable to make molded parts or articles rather than have a plastic cementitious mass that is used for bonding together building elements or forming a cement coating that is troweled on. When it is desired to make molded cement articles without the necessity of firing, the cements of the present invention can be readily employed. In such instances it is sometimes preferable to mix only sufficient silica sol with the filler-and-setting agent powder to make the resulting mix sufficiently moist that it may be formed by compression in a suitable mold. The powder-to-liquid ratios in this case are accordingly relatively high, on the order of 4 to 6.

The following example illustrates a composition suitable for molding:

*Example IX*

A dry, siliceous mixture, composed of 97% by weight 200 mesh quartz flour and 3% of the same setting agent employed in Example I was just moistened with the "Ludox" sol of Example I to form a uniformly damp blend. This was done by adding 1 part by weight "Ludox" to 4 parts of the dry mix. The blend was then pressed in a mold. The resulting molded member was extremely dense, hard and resistant to heat, after curing.

Although it is not essential that the molded articles made from the cements of the present invention be fired in the manner that ceramic bricks are generally made, they may be further modified to useful or aesthetic ends by sintering, overglazing or even fusion at sufficiently high temperatures. Such molded articles are suitable for structural elements, electrical insulators and containers or carriers for corrosive chemicals.

This application is a continuation-in-part of my copending applications Serial No. 591,816, filed June 18, 1956, now abandoned, and Serial No. 703,995, filed December 20, 1957, now abandoned, said application Serial No. 591,816 being a continuation-in-part of application Serial No. 505,853, filed May 3, 1955, now abandoned.

Having described my invention, I claim:

1. As a cold setting cement composition the combination of a particulate filler contributing the major proportion of the solids content of the cement, an aqueous silica sol as a binder for said filler in an amount sufficient to bond said filler into a coherent mass, and from .2% to 15% by weight based on the weight of said filler, of a solid alkali metal silicate as a setting agent for said silica sol, said silicate having an alkali metal oxide to silica mole ratio within the range of from 1:1 to 1:4.2, said filler being essentially insoluble in the water of said silica sol and being substantially inert with respect to said sol.

2. As a cold setting cement composition the combination of a particulate inert filler contributing the major proportion of the solids content of the cement, an aqueous silica sol as a binder for said filler in an amount sufficient to bond said filler into a coherent mass, said sol containing at least 10% by weight of colloidal silica, and from .2% to 15% by weight, based on the weight of said filler, of a finely divided solid alkali metal silicate as a setting agent for said silica sol, said silicate having an alkali metal oxide to silica mole ratio in the range of from 1:1 to 1:4.2, said filler being essentially insoluble in the water of said silica sol and being substantially inert with respect to said sol.

3. As a cold setting cement composition the combination of a particulate filler contributing from 80% to 97% by weight of the solids content of the cement, an aqueous silica sol as a binder for said filler in an amount sufficient to bond said filler into a coherent mass, said silica sol containing at least 20% by weight of colloidal silica, and from .2% to 15% by weight, based on the weight of said filler, of a finely divided solid sodium silicate having an $Na_2O:SiO_2$ mole ratio in the range of from 1:1 to 1:4.2, said filler being essentially insoluble in the water of said silica sol and being substantially inert with respect to said sol.

4. A cured cement produced by blending a particulate filler in such proportion that the filler contributes the major proportion of the solids content of the cured cement, from .2% to 15% by weight, based on the weight of said filler, of a finely divided solid alkali metal silicate having an alkali metal oxide to silica mole ratio in the range of from 1:1 to 1:4.2, and an aqueous silica sol as a binder for said filler in an amount sufficient to bond said filler into a coherent mass, said sol containing at least 10% by weight of colloidal silica, said filler being essentially insoluble in the water of said silica sol and being substantially inert with respect to said sol.

5. A cured cement in accordance with claim 4 in which said alkali metal silicate is a sodium silicate.

6. A method in accordance with claim 4 in which said alkali metal silicate is a sodium silicate, having an $Na_2O:SiO_2$ mole ratio in the range of 1:1.4 to 1:3.3.

7. A cured cement in accordance with claim 4 in which said aqueous silica sol contains at least 20% by weight of colloidal silica.

8. A cured cement in accordance with claim 4 in which said particulate filler consists predominantly of finely-divided quartz.

9. A cured cement produced by blending a particulate filler in such proportion that the filler contributes from 80% to 97% by weight of the solids content of the cured cement, from .2% to 15% by weight, based on the weight of said filler, of a solid finely divided sodium silicate having an $Na_2O:SiO_2$ mole ratio in the range of 1:1 to 1:4.2 and an aqueous silica sol as a binder for said filler in an amount sufficient to bond said filler into a coherent mass, said sol containing at least 20% by weight of colloidal silica, said filler being essentially insoluble in the water of said silica sol and being substantially inert with respect to said sol.

10. A cured cement in accordance with claim 9 in which the $Na_2O:SiO_2$ mole ratio is in the range of from 1:1.4 to 1:3.3.

11. A cured cement in accordance with claim 9 in which the sodium silicate setting agent is a mixture of finely-divided sodium silicates having $Na_2O:SiO_2$ mole ratios within the range of from 1:1 to 1:4.2, one of said silicates having a $Na_2O:SiO_2$ mole ratio in the higher portion, and the other said silicates having an $Na_2O:SiO_2$ mole in the lower portion of said range.

12. As a composition suitable for admixture with an aqueous silica sol to form a cold setting cement, the combination of a particulate filler blended with from .2% to 15% by weight, based on the weight of said filler, of a finely divided solid alkali metal silicate as a setting agent for the silica sol, said silicate having a mole ratio of alkali metal oxide to silica in the range of from 1:1 to 1:4.2, said filler being essentially insoluble in the water of said silica sol and being substantially inert with respect to said sol.

13. The composition in accordance with claim 12 in which said filler consists predominantly of finely divided quartz and in which said alkali metal silicate setting agent is in the proportion of from 2% to 10% by weight of the composition.

14. A composition in accordance with claim 12 in which said alkali metal silicate is a sodium silicate.

15. A composition in accordance with claim 12 in which said alkali metal silicate is a mixture of finely-divided sodium silicates having $Na_2O:SiO_2$ mole ratios within the range of from 1:1 to 1:4.2, one of said silicates having an $Na_2O:SiO_2$ mole ratio in the higher portion, and the other of said silicates having an $Na_2O:SiO_2$ mole ratio in the lower portion of said range.

References Cited in the file of this patent

UNITED STATES PATENTS

| | | |
|---|---|---|
| 1,408,960 | Schiff | Mar. 7, 1922 |

FOREIGN PATENTS

| | | |
|---|---|---|
| 256,258 | Great Britain | Mar. 10, 1927 |
| 396,964 | Great Britain | Aug. 17, 1933 |

---

UNITED STATES PATENT OFFICE

CERTIFICATE OF CORRECTION

Patent No. 2,914,413           November 24, 1959

Robert S. Mercer

It is hereby certified that error appears in the printed specification of the above numbered patent requiring correction and that the said Letters Patent should read as corrected below.

Column 1, line 15, for "settling" read -- setting --; column 5, line 28, for "$Na_2O:SiO_3$" read -- $Na_2O:SiO_2$ --; line 32, for "$Na_3O:SiO_2$" read -- $Na_2O:SiO_2$ --.

Signed and sealed this 10th day of May 1960.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,914,413                                            November 24, 1959

Robert S. Mercer

It is hereby certified that error appears in the printed specification of the above numbered patent requiring correction and that the said Letters Patent should read as corrected below.

Column 1, line 15, for "settling" read -- setting --; column 5, line 28, for "$Na_2O:SiO_3$" read -- $Na_2O:SiO_2$ --; line 32, for "$Na_3O:SiO_2$" read -- $Na_2O:SiO_2$ --.

Signed and sealed this 10th day of May 1960.

(SEAL)
Attest:
KARL H. AXLINE
Attesting Officer

ROBERT C. WATSON
Commissioner of Patents